(12) United States Patent
Rolfes et al.

(10) Patent No.: US 7,210,401 B1
(45) Date of Patent: May 1, 2007

(54) SINGLE CUP POD BEVERAGE BREWER

(76) Inventors: Patrick J. Rolfes, 2006 Seadrift Dr., Corona Del Mar, CA (US) 92625; Paul E. Rolfes, 88 Ocean Vista, Newport Beach, CA (US) 92660

( * ) Notice: Subject to any disclaimer, the term of this patent is extended or adjusted under 35 U.S.C. 154(b) by 375 days.

(21) Appl. No.: 10/828,046

(22) Filed: Apr. 20, 2004

(51) Int. Cl.
*A47J 31/06* (2006.01)
*A47J 31/40* (2006.01)

(52) U.S. Cl. ............ 99/289 R; 99/295; 99/302 R
(58) Field of Classification Search .......... 99/289 R, 99/295, 302 R, 280, 282, 283
See application file for complete search history.

(56) References Cited

U.S. PATENT DOCUMENTS

| | | | |
|---|---|---|---|
| 4,791,859 A | 12/1988 | King | |
| 5,063,836 A | 11/1991 | Patel | |
| 5,134,924 A * | 8/1992 | Vicker | 99/280 |
| 5,161,455 A | 11/1992 | Anson et al. | |
| 5,404,794 A | 4/1995 | Patel et al. | |
| 5,836,236 A | 11/1998 | Rolfes et al. | |
| 6,345,570 B1 * | 2/2002 | Santi | 99/289 R |
| 6,510,783 B1 * | 1/2003 | Basile et al. | 99/289 R |
| 6,857,352 B2 * | 2/2005 | Fischer | 99/280 |
| 6,857,353 B2 * | 2/2005 | Kollep et al. | 99/289 R |
| 6,904,840 B1 * | 6/2005 | Pfeifer et al. | 99/295 |

* cited by examiner

*Primary Examiner*—Reginald L. Alexander
(74) *Attorney, Agent, or Firm*—Gordon K. Anderson

(57) ABSTRACT

A single cup pod beverage brewer is presented utilizing a pod (20) containing coffee grounds or tea leaves surrounded by filter paper. A pod holding chamber (22) consisting of a upper head (26) and a lower head (28) having an ejection disc (42). An upper head mounting frame (48) is attached to its horizontal base (50) and includes lower head rotating arms (60) attached to a first shaft (62) with a first gear motor (66) rotating the arms into a pod loading position, a pod brewing position and a pod disposal position. A second gear motor (66*a*) is secured to the upper head mounting frame, driving a cam (76) through a second shaft (62*a*) engaging the upper head to lower, seal and raise said upper head. A pod ejector solenoid (84) is disposed on the base electromechanically propelling the pod from the chamber when the lower head in the pod disposal position. An electronic control system employs a solid state direct current arrangement for control regulation and alternating current for heating system functions. An enclosure with panels and a door (90) protects moving elements and electrical controls.

17 Claims, 7 Drawing Sheets

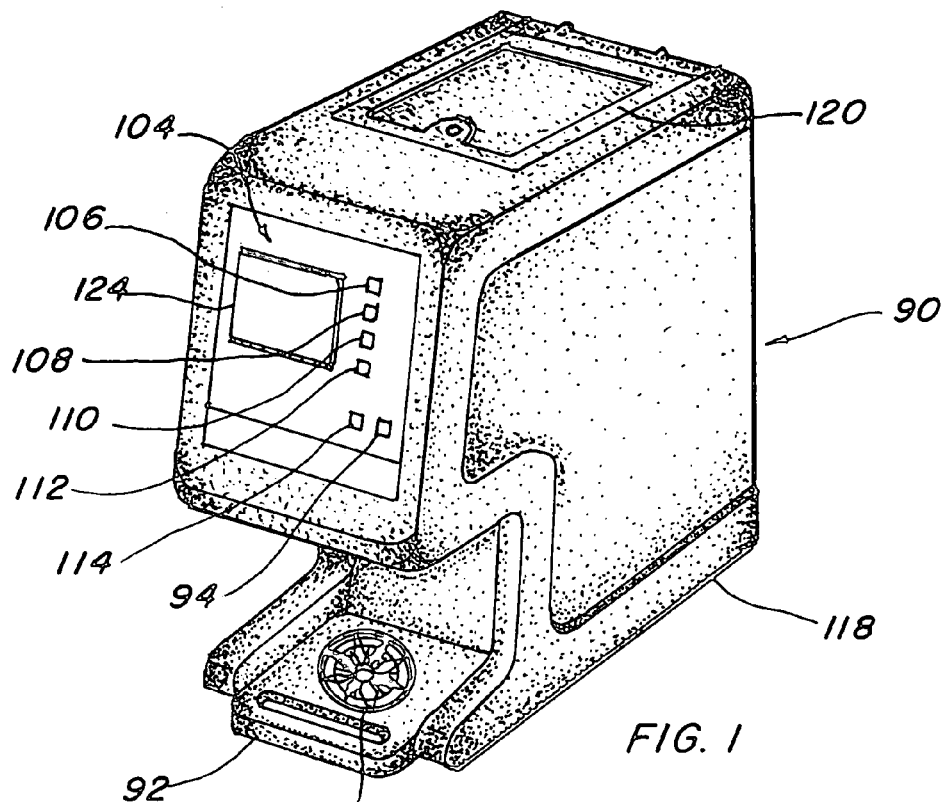
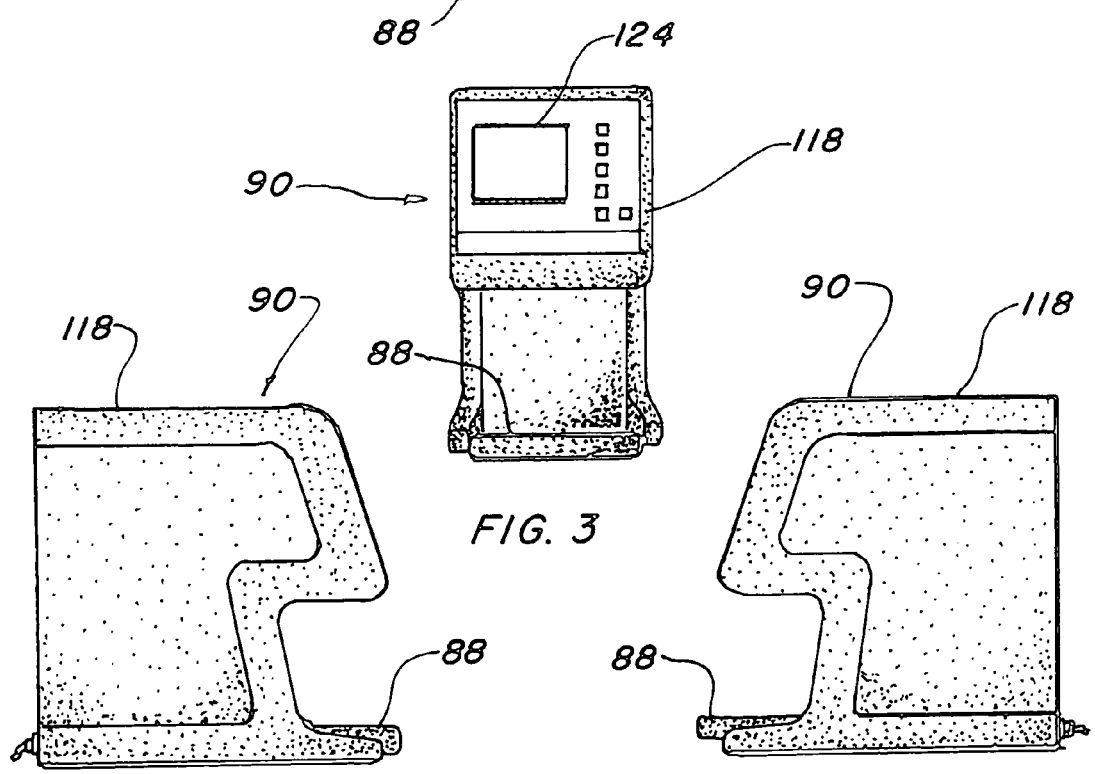
FIG. 1
FIG. 2
FIG. 3
FIG. 4

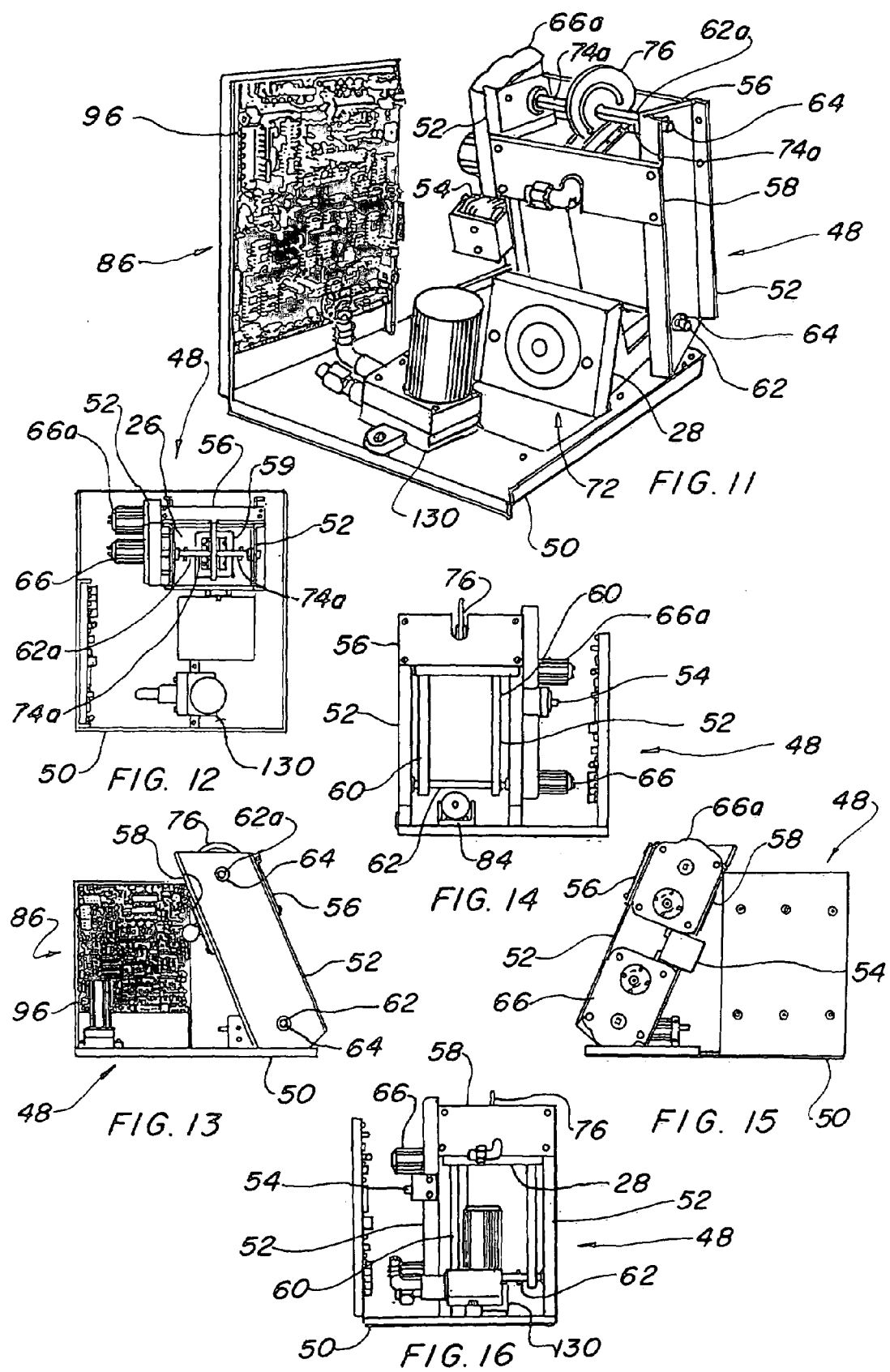

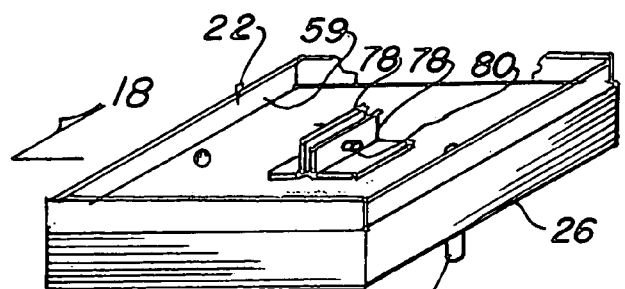
FIG. 17
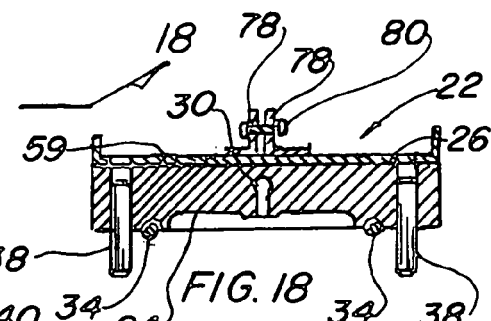
FIG. 18
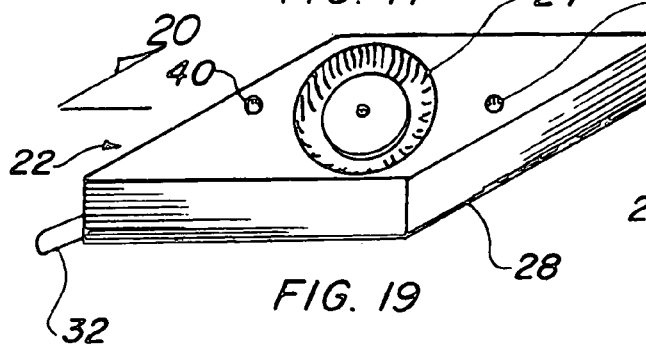
FIG. 19
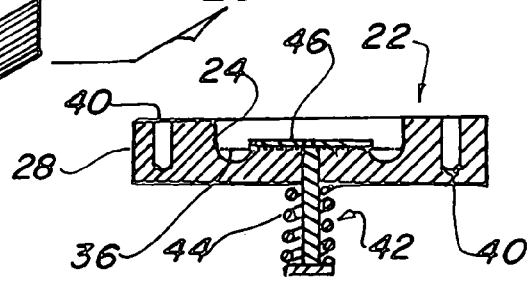
FIG. 20
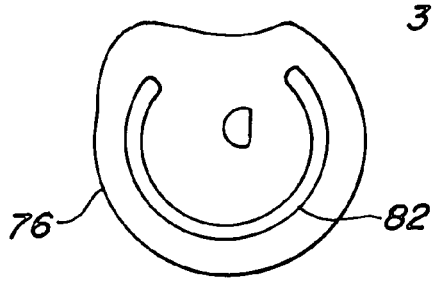
FIG. 21
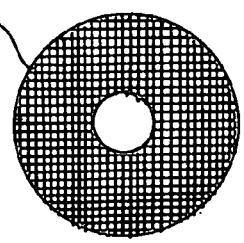
FIG. 22
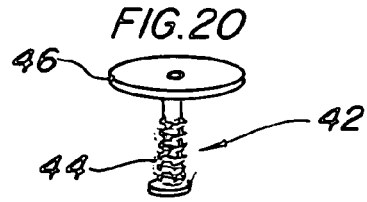
FIG. 23
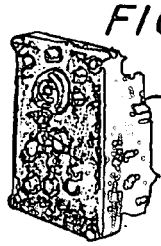
FIG. 24
FIG. 25
FIG. 26
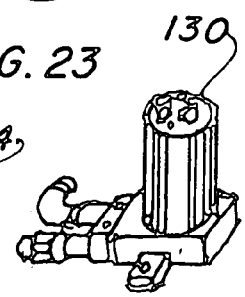
FIG. 27
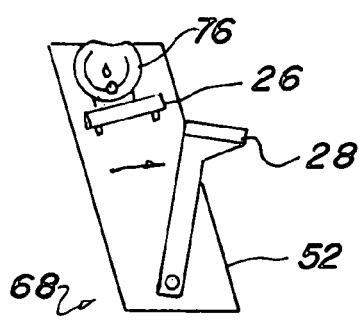
FIG. 28
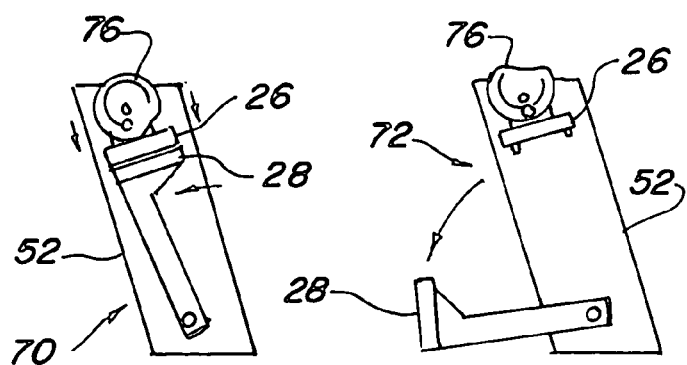
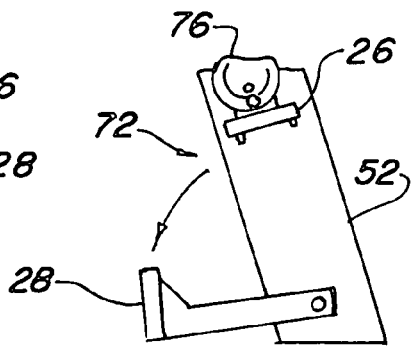
FIG. 29  FIG. 30

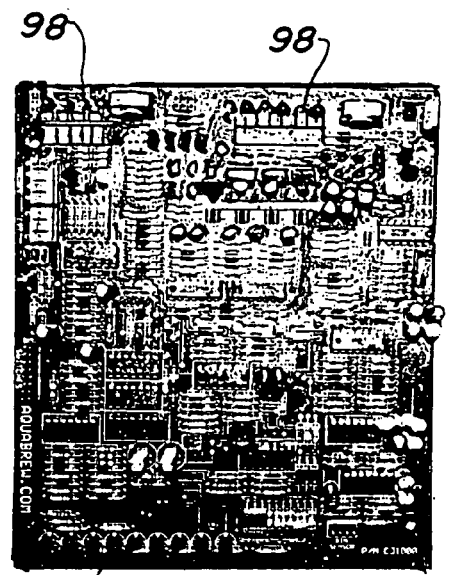
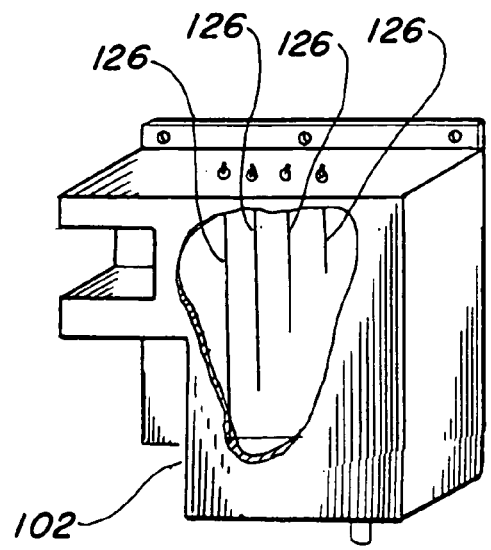
FIG. 31              FIG. 32
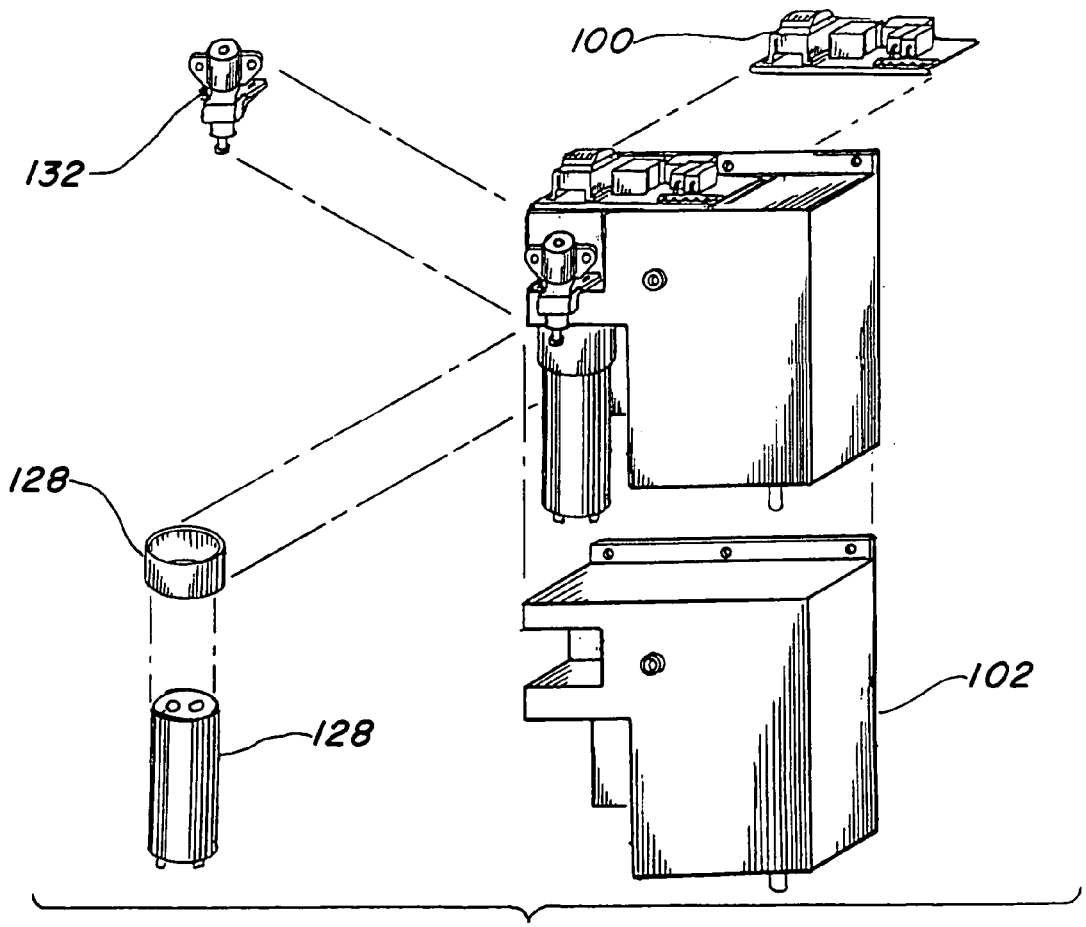
FIG. 33

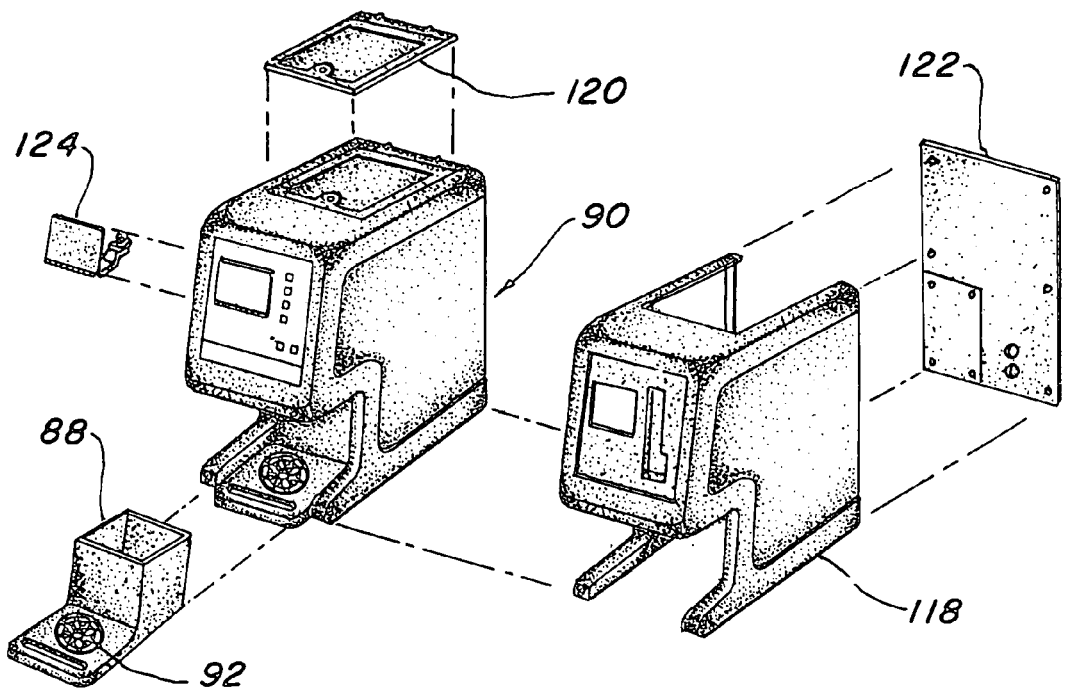
FIG. 34
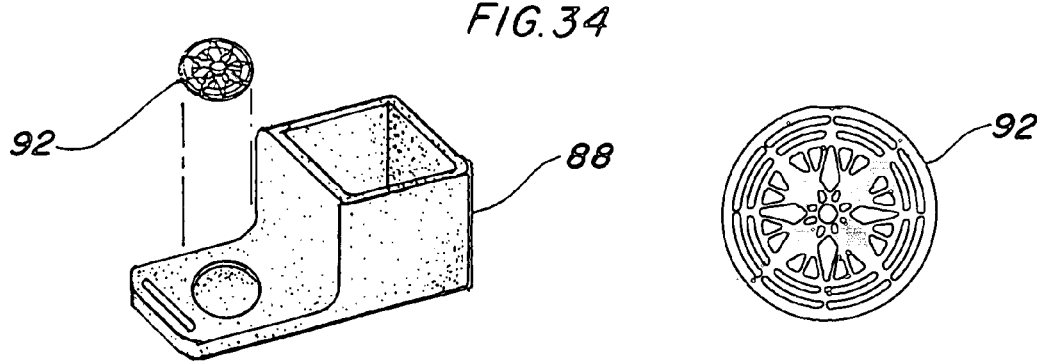
FIG. 35
FIG. 36
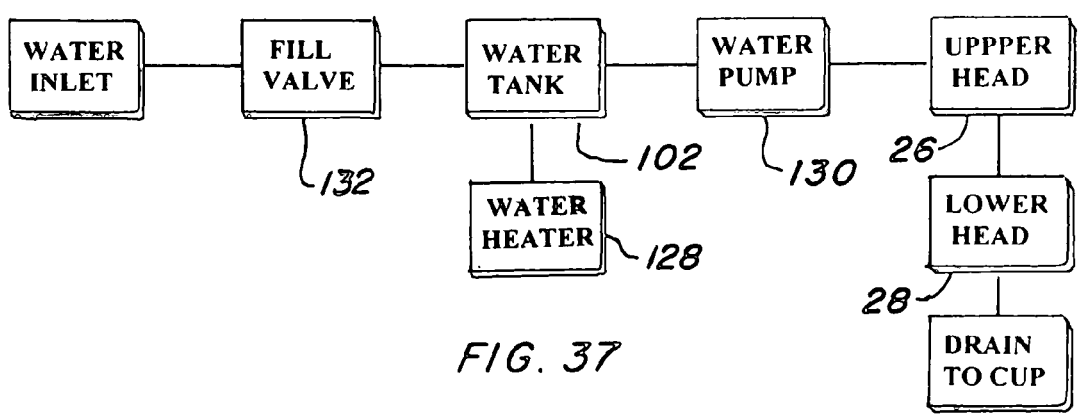
FIG. 37

SINGLE CUP POD BEVERAGE BREWER

TECHNICAL FIELD

The present invention relates to beverage brewers in general. More specifically to a single cup brewer utilizing a pod for automatically brewing coffee or tea one cup at a time with a pod that contains coffee grounds or tea leaves surrounded by filter paper formed into a disc-like shape.

BACKGROUND ART

Previously, many coffee and tea brewing apparatus have been used in endeavoring to provide an effective means to automatically brew beverages, however in most cases the effort has been directed to loose grounds or leaves in large batches for multiple cups brewing.

The prior art listed below did not disclose patents that possess any of the novelty of the instant invention; however the following U.S. patents are considered related:

| U.S. Pat. No. | Inventor | Issue Date |
|---|---|---|
| 5,875,703 | Rolfes | Mar. 2, 1999 |
| 5,836,236 | Rolfes et al. | Nov. 17, 1998 |
| 5,404,794 | Patel et al. | Apr. 11, 1995 |
| 5,161,455 | Anson et al. | Nov. 10, 1992 |
| 5,063,836 | Patel | Nov. 12, 1991 |
| 4,791,859 | King | Dec. 20, 1988 |

Rolfes own U.S. Pat. No. 5,875,703 teaches an improvement on a coffee brewer and hot water dispenser which permits larger capacity by the use of a bypass hot water cycle adding a predetermined volume of water to the container and supplementing the control by expanding its capabilities using multiple sequencing of the brew cycle for increasing the volume of brewed coffee. No brewing completion indication is taught in this prior art.

U.S. Pat. No. 5,836,236 issued to Rolfes et al., which the first named inventor is the present inventor of the instant single cup pod beverage brewer, discloses a coffee brewer and hot water dispenser which brews both coffee and also dispensed hot water from a separate system. The invention discloses a brewer with a solid state electronic control that includes all of the necessary functions to brew coffee however when the brewing is completed the system de-energizes and a green ready light is illuminated.

Patel et al. in U.S. Pat. No. 5,404,794 teaches a beverage brewing device for coffee or iced tea. A decanter support platform extends or retracts and has an integral warming plate built in. The device also has an electric circuit capable of brewing coffee when the support platform is in the extended position and tea when retracted.

Patel in U.S. Pat. No. 5,063,836 teaches a coffee making machine of the type adapted to be connected to city water supply. The device includes a reservoir having a level sensor controlling a water refill valve to the reservoir and a heating element which heats the water therein. A level sensor functions to permit automatic refill of the reservoir at the appropriate level for subsequent brewing of a full pot of coffee irrespective of the water pressure and the previous route of the water. A solid state circuit board controls the operational sequence and functions of the machine. The device includes a base with a warming plate on which a coffee pot may rest and columns upon which most of the operating components are mounted.

U.S. Pat. No. 4,791,859 issued to King is for a beverage brewer which has movable upper and lower heads with a removable strip-shaped filter therebetween. A hold down grid engages the top surface of the filter as a piston moves in the lower head upwardly to force air though the filter to agitate the beverage. When the piston reaches top dead center, the hold down grid is lifted. When the piston passes the opening the brewed coffee is poured.

DISCLOSURE OF THE INVENTION

Automatic beverage brewers, particularly for commercial establishments, have been commonly used for some time however these devices have been limited to relatively large quantities of beverage to be supplied. For coffee brewing the grounds are placed in a basket lined with a filter, usually of paper, and hot water is introduced over the coffee grounds with the brewed liquid drained into a container which is maintained at the optimum temperature.

Recently the use of a single cup brewer has been found to be useful when only one cup is required. In order to fill this need a pod has been developed and has been well accepted by the public particularly in Europe. The pod is configured to contain coffee grounds or tea leaves surrounded by filter paper formed into a disc-like shape much like a tea bag except for its outlined form.

Since the use of a pod is now becoming popular in this country, it is a primary object of the invention to have a device for commercial use that brews not only coffee one cup at a time but also tea and further includes hot water for hot chocolate or soup etc. This invention fills the need in commercial areas such as businesses offices and factories etc. where the brewing of a large pot or carafe is impractical. Further the instant brewing of the beverage permits a fresh cup rather than trying to keep the brew hot over a period of time without deterioration of taste and aroma. It may be clearly seen that the invention fills the need easily for a large segment of the population.

One of the improved features of the invention is in the method of brewing where hot water enters the pod holding chamber recess at the top dead center and exits from an area below after the water has infused through the pod seeping the flavors and body from the coffee grounds or tea leaves. The area of the chamber recess is actually the circumferential perimeter of the pod bordering a disc face plate which permits the flow path to optimize the brewing qualities of the coffee grounds or tea leaves utilizing the entire cross sectional area of the pod. Prior art usually relies on the sieve approach which aligns holes in the top and bottom covering only a fraction of the grounds or leaves with each hole instead of the full flow through the entire pod.

An important object of the invention is that the invention deals with two separate beverages requiring totally different brewing procedures, it has been found that it is best to use water volume for brewing coffee, not time, and time plus a hold mode is an optimum procedure for brewing tea. The present invention solves this problem by the utilization of a solid state controller that easily senses the functions and electromechanically provides the necessary operational capabilities to accomplish both of these requirements using the same basic components.

Still another object of the invention is that the solid state controller requires no electrical limit switches for sensing position of the components instead the invention uses a unique water level control which is based on sensing the exact level using metal probes sensing a low voltage electrical D.C. current transmitted through the water. The position of the pod for brewing is sensed by permitting a gear motor to stall when mechanically restrained with the current draw sensed by the controller shutting off the motor rather than using a separate limit switch for that purpose.

Still another object is directed to the use of illuminated touch switches in the control panel which indicate there "on" position as well as staying lit and blink on and off until the function is completed.

Yet another object of the invention that an electronic controller printed circuit board contains a complete series of trouble shooting LEDs which indicate the function of the system. This feature makes it extremely easy for maintenance personnel to locate any problems in the controls.

A further object of the invention is that solid state D.C. controls including solenoids and gear motors are utilized in conjunction with A. C. hot water heating system which optimizes power consumption and simplicity of operation.

A final object of the invention is that the pod loading door is completely automatic and opens by itself when required after the mode selection switch is energized and closes without the use of specific controls as it is physical opened by the lower head rotating arm and closes by gravity. These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment.

FIG. 2 is a left side view of the preferred embodiment.

FIG. 3 is a front side view of the preferred embodiment.

FIG. 4 is a right side view of the preferred embodiment.

FIG. 11 is a partial isometric view of the upper head mounting frame assembly in the preferred embodiment.

FIG. 12 is a top view of the upper head mounting frame assembly in the preferred embodiment.

FIG. 13 is a left side view of the upper head mounting frame assembly in the preferred embodiment.

FIG. 14 is a front view of the upper head mounting frame assembly in the preferred embodiment.

FIG. 15 is a right side view of the upper head mounting frame assembly in the preferred embodiment.

FIG. 16 is a rear view of the upper head mounting frame assembly in the preferred embodiment.

FIG. 17 is a partial isometric view of the upper head in the preferred embodiment.

FIG. 18 is a cross sectional view taken along lines 18—18 of FIG. 17.

FIG. 19 is a partial isometric view of the lower head in the preferred embodiment.

FIG. 20 is a cross sectional view taken along lines 20—20 of FIG. 19.

FIG. 21 is a plan view of the cam in the preferred embodiment.

FIG. 22 is a plan view of the strainer in the preferred embodiment.

FIG. 23 is a partial isometric view of the ejection disc in the preferred embodiment.

FIG. 24 partial isometric view of one of the gear motors with a coupling attached to the output shaft in the preferred embodiment.

FIG. 25 is a partial isometric view of the lower head positioning solenoid in the preferred embodiment.

FIG. 26 is a partial isometric view of the pod ejector solenoid in the preferred embodiment.

FIG. 27 is a partial isometric view of the hot water pump in the preferred embodiment.

FIG. 28 is a schematic representation of the lower head arcuate rotating arm in the pod loading position of the preferred embodiment.

FIG. 29 is a schematic representation of the lower head arcuate rotating arm in the pod brewing position of the preferred embodiment.

FIG. 30 is a schematic representation of the lower head arcuate rotating arm in the pod disposal position of the preferred embodiment.

FIG. 31 is a view of the front of the solid state control board in the preferred embodiment.

FIG. 32 is a cutaway view of the hot water tank illustrating the level sensing probes.

FIG. 33 is an exploded view of the hot water tank system in the preferred embodiment illustrating the inlet water solenoid valve, hot water heater and alternating current board.

FIG. 34 is an exploded view of the enclosure including the body, back panel, top panel, lower head door and bin.

FIG. 35 is an exploded view of the bin.

FIG. 36 is a plan view of the cup trivet.

FIG. 37 is a block diagram of the hot water system including its interconnections.

BEST MODE FOR CARRYING OUT THE INVENTION

Figure 8:
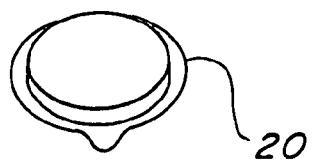
FIG. 8 is a partial isometric view of a pod shown singly.

The best mode for carrying out the invention is presented in terms of a preferred embodiment. This preferred embodiment of a single cup pod beverage brewer is shown in FIGS. 1 thorough 37 and utilizes a pod 20 containing coffee grounds or tea leaves surrounded by filter paper formed in a disc-like shape. FIG. 8 illustrates this pod which is recently becoming popular in this country. It should be recognized that the same shape and size of pod 20 is used for both coffee and tea beverages therefore the same mechanism may be utilized for handling and processing the pod 20 in the invention.

A pod holding chamber 22 is employed to retain the pod 20 and includes a recess 24 therein configured to mate with the pod 20 without crushing it and yet securely gripping the filter paper on its periphery. The holding chamber 22 is formed in two separate halves which comprise an upper head 26 and a lower head 28 with the upper head 26 having a hot water inlet 30 and the lower head 28 having a liquid outlet 32.

FIGS. 17–20 illustrate the upper and lower heads 26 and 28 respectively with the upper head 26 including an o-ring 34 disposed into a groove in the upper head around said recess 24 configured to mate with the pod 20. The use of the o-ring 34 creates a water tight seal between said upper head 26 and the lower head 28 when the two mating halves are urged together. A strainer 36, shown by itself in FIG. 22, is positioned within the recess 24 for preventing coffee grounds or tea leaves from being included in the brew. A plurality of dowel pins 38 are positioned in the upper head 26 and the lower head 28 has mating dowel pin holes 40 for alignment of the upper head 26 and the lower head 28 when sealed together with the pod 20 in between.

An ejection disc 42 slideably penetrates through the lower head 28 and includes an integral spring loaded stem 44 and a face plate 46 sized to intimately embrace the pod 20 when manually inserted between the lower head 28 and the upper head 26.

The ejection disc face plate 46 has a diameter of from 60% to 70% smaller than the chamber recess 24 diameter. The reason for controlling the diameter of the face plate 46 is that one of the improved features of the invention is that the hot water enters the chamber recess 24 at the top dead center and exits from an area on the lower head 28 after the water has infused through the pod 20 seeping the flavors and body from the coffee grounds or tea leaves. The area on the lower head 28 is defined as a circumferential perimeter of the pod 20 bordering the injection disc face plate 46, as it may be realized the flow path optimizes the brewing qualities of the media in the pod 20 utilizing the entire cross sectional area of the pod 20.

An upper head mounting frame 48 is attached to a horizontal base 50 movably retaining the upper head 26 as illustrated in FIGS. 11–16. Two channel shaped columns 52 are attached to the base 50 and a lower head positioning solenoid 54 is fastened to one of the columns 52 for positioning the lower head into a pod brewing position. The columns 52 are angled toward the center of the base 50 and a front plate 56 a rear plate 58 and a top pan 59 tie the columns 52 together structurally, as shown in FIGS. 11, 12, 14 and 16.

Two lower head arcuate rotating arms 60 are positioned parallel between the columns 52 for retaining and positioning the lower head 28. A first shaft 62 is attached through the arms 60 penetrating the upper head mounting frame 48 on each side with bronze oil permeable bearings 64. A first gear motor 66 is attached to the upper head mounting frame 48 and rotates the first shaft 62 along with its arms 60 into three discrete positions i.e. a pod loading position 68, a pod brewing position 70 and a pod disposal position 72 as illustrated in FIGS. 28–30. A first shaft spacer sleeve 74 is placed over the first shaft 62 between the arms 60.

Sealing means for sealing the pod 20 within the pod holding chamber 22 permit hot water to be introduced into the chamber 22. The sealing means are defined as a second gear motor 66a, secured to the upper head mounting frame 48 driving a cam 76 engaging the upper head 26 for lowering, sealing and raising the upper head 26.

Figure 9:
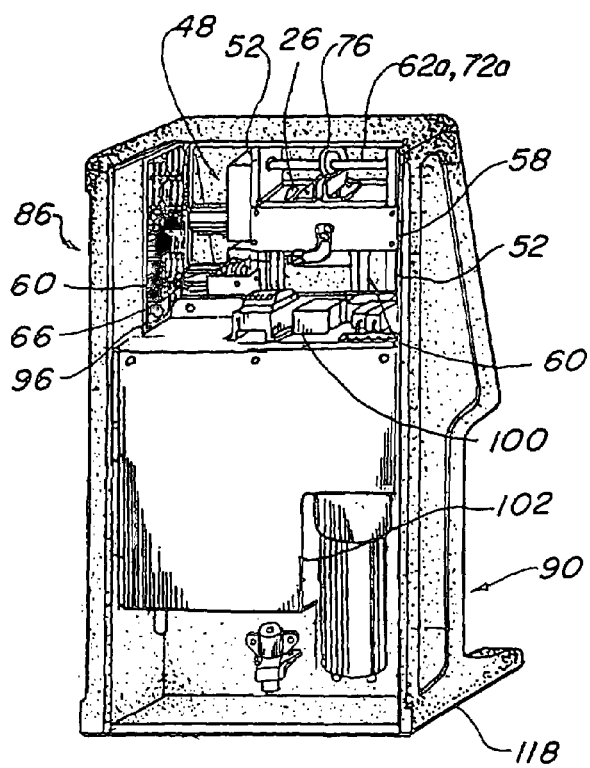
FIG. 9 is a partial isometric view of the preferred embodiment with the top and rear panels removed to illustrate the components inside.
Figure 10:
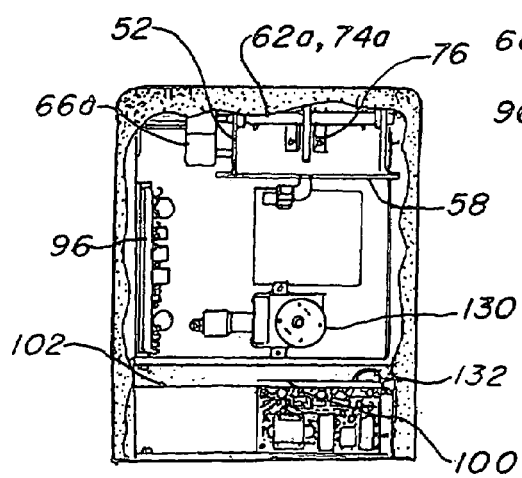
FIG. 10 is a plan view of the brewing device with the top and rear panels removed and the top flange of the body partially cut away for clarity.
Figure 9A:
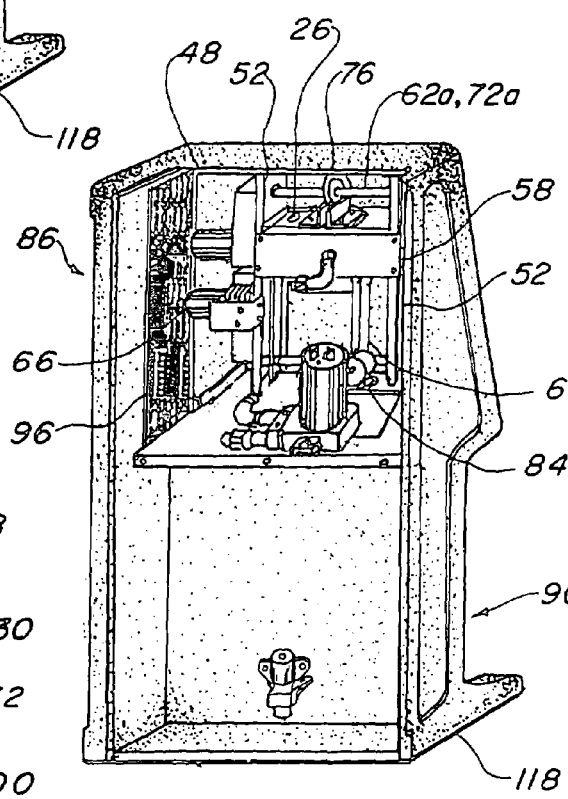
FIG. 9a is a partial isometric view of the preferred embodiment with the top panel, rear panel and hot water tank assembly removed to best illustrate the remaining components inside.

A pair of parallel angle brackets 78 are attached to the top pan 59 and include a pin 80 that is disposed between the upstanding legs of the brackets 78 penetrating a groove 82 in the cam 76 such that when the cam 76 is rotated clockwise by the second gear motor 66a, the cam 76 engages the upper head 26 on the cams periphery forcibly urging the upper head 26 downwardly until mating with the lower head 28 with sufficient force exerted to stall the gear motor 66a and complete the o-ring 34 seal A second shaft spacer sleeve 74a slips over a second shaft 62a between the second gear motor 66a and the cam 76 positioning the cam 76 on the shaft 62a as shown in FIGS. 9, 9a and 11. When rotated by the second gear motor 66a the pin 80 penetrating the groove 82 in the cam 76 lifts the upper head 26 away from the lower head 28.

As described above, when the lower head arcuate rotating arms 60 are being rotated to the brewing position 70 the push type lower head positioning solenoid 54 is energized and its plunger is driven outwardly by electromagnetic force impeding the arcuate travel of the arms 60 at the exact position permitting mating of the upper and lower heads 26 and 28 stalling the gear motor 66. The electronic controls sense an increase in power consumption of the stalled gear motor 66 and shuts off the power.

Figure 5:
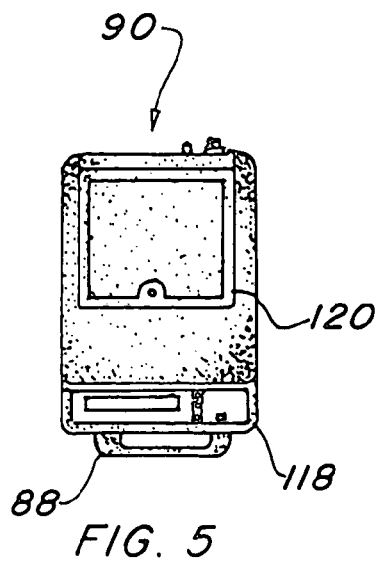
FIG. 5 is a top view of the preferred embodiment.
Figure 6:
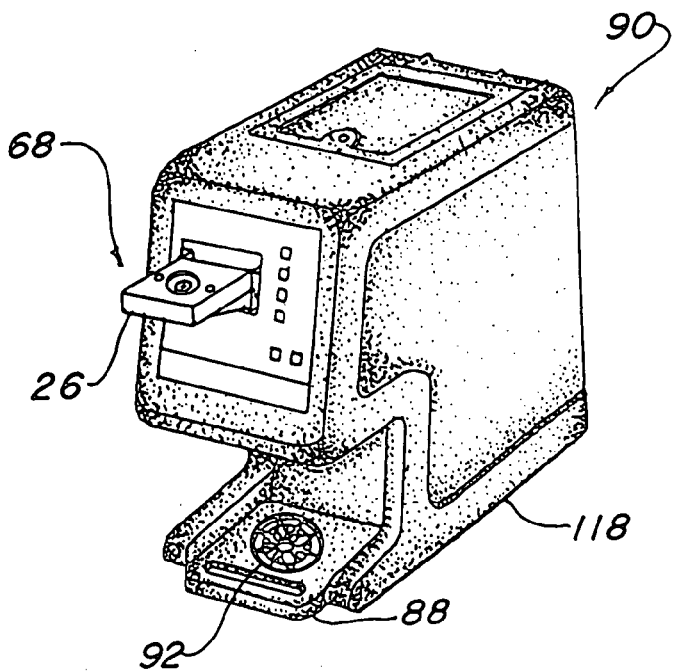
FIG. 6 is a partial isometric view of the preferred embodiment with the hinged door open and the lower head extended ready to manually receive a pod.
Figure 7:
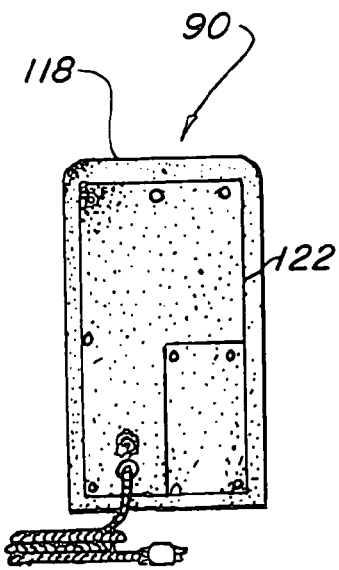
FIG. 7 is a rear view of the preferred embodiment.

A pod ejector 84, in the form of a push type solenoid, is attached to the mounting frame horizontal base 50 and electromechanically propels the pod 20 from the chamber recess 24 when the lower head 28 is oriented vertically in the pod disposal position 72. the ejector solenoid 84 removes the pod 20 from contact with the lower head 28. The ejector solenoid 84 is energized by an electronic control system 86 programmed to strike the ejection disc 42 at least once, preferably twice thereby assuring complete removal of the pod 20 from contact with the lower head 28 for disposal. The single cup pod beverage brewer includes a pod disposal bin 88 removably housed within the beverage brewers enclosure 90, as illustrated in FIGS. 5, 6 and 34. The bin 88 by itself is shown in FIG. 35 and includes a metallic cup trivet 92. When the bin 88 is full, an optical sensor (not shown) indicates that the spent pods 20 have reached the upper fill limit and energizes a bin full indication light 94 preventing further operation until the bin 88 is emptied.

The invention includes an electronic control system with a solid state direct current arrangement for functional regulation and alternating current devices such as solid state devices for controlling the system functions. The electronic control system consists of a solid state control board 96 that includes light emitting diodes (LED's) 98 indicating functional operation of the system for trouble shooting and an alternating current board 100 controls the hot water system. The gear motors 66, 66a and solenoids 54 and 84 function on the D.C. circuit of the controller. The solid state control board 96 is illustrated alone in FIG. 31 and is installed onto an upper flange of the base plate 46 as shown in FIGS. 9 and 11. The alternating current board 100 is illustrated in FIG. 33 and is installed on top of a hot water tank 102 that is positioned within the rear of the enclosure 90 as depicted in FIG. 9.

To complete the control system an instrument panel is located on the front of the enclosure 90 and employs illuminated touch control switches for the following functions; open position 106, coffee brewing 108, tea brewing 110, hot water service 112 and lights for water quality 114 and bin full indication 94. The touch control switches incorporate lights that indicate the process is continuing to function. The electronic control system further recognizes manual hot water selection when the hot water service switch 112 is energized and regulates the volume of hot water entering through the upper head 26 and exiting from the lower head 28 when hot water is selected for making other beverages such as hot chocolate or soup.

The enclosure 90 encases the entire single cup pod beverage brewer protecting moving elements and electrical controls. The enclosure 90 includes a body 118, a top panel 120, a back panel 122 and a lower head door 124, as illustrated in FIG. 34. The enclosure 90 is preferably made of a polyethylene thermoplastic formed by rotational molding; however other types of material and fabrication techniques may be used with equal ease while achieving the same functional utility. The lower head door 124 is hinged on the bottom and is counter balanced with a protruding arm permitting the door 124 to open automatically when the lower head 28 is rotated outwardly into the pod loading position 68 and return to its closed position by gravity when the lower head 28 moves to the brewing position 70.

In order to provide the requisite hot water, a system is included that automatically maintains water at a given level and temperature. This system consists of the tank 102 including level sensing probes 126, a hot water heater 128, a hot water pump 130, an inlet water level solenoid valve 132 used for attachment to a mains water source and a water temperature sensing thermistor (not shown). The hot water system is illustrated in FIG. 33 in an exploded view. The probes 126 consisting of stainless steel wire rod with an electrical connector crimped on one end. The plain end of the rod is forced through a hole in the tank 102 which grips the probe securely and permits minor adjustments by sliding the probe up or down. Four probes 126 are preferably used as follows:

Green probe for ground or common
Red probe for brew off or minimum level
Yellow probe for standby fill
Blue probe for indicating full level The method of automatically brewing a single cup of coffee or tea one cup at a time utilizing a pod, consists of the steps of placing a pod 20 containing coffee grounds or tea leaves surrounded by filter paper in a horizontally oriented pod loading position 68, arcuately rotating the pod 20 into a pod brewing position 70 and hermetically sealing the pod 20 by completely enclosing the pod 20 within a holding chamber 22. Hot water is then introduced into the sealed pod 20 with the water flowing from the pod center to an area defined as a circumferential perimeter of the pod 20, permitting the water to infuse into the pod 20, seeping the flavors and body from the coffee grounds or tea leaves. The next step is to drain the brewed hot water and then arcuately rotate the pod 20 into a vertical pod disposal position 72 propelling the pod into a bin 88 for disposal.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A single cup pod beverage brewer for automatically brewing coffee or tea one cup at a time utilizing a pod, containing coffee grounds or tea leaves surrounded by filter paper formed in a disc-like shape, the invention comprising, a sealed pod holding chamber, configured to retain a coffee or tea pod, said pod holding chamber having an upper head and a lower head, said upper head having the hot water inlet on a top surface, said lower head having a liquid outlet on a bottom surface, an o-ring disposed between the upper head and a lower head for creating a water tight seal therebetween and a ejection disc, including an integral spring loaded stem, with the stem slideably disposed though the lower head, means for sealing a pod within the chamber, permitting hot water to enter through upper head and exit from an area on said lower head after the water has infused a pod seeping the flavors and body from the coffee grounds or tea leaves, wherein said area on said lower head defined as a circumferential perimeter of a pod, and pod ejection means for removing a pod after infusion from the lower head by electromechanically propelling a pod from the chamber when the lower head is oriented vertically, thereby totally removing a pod from contact with the lower head for disposal, wherein said vertical pod ejection means further comprises, a pod ejection solenoid striking said ejection disc stem such that a pod is driven completely away from the lower head.

2. The single cup pod beverage brewer as recited in claim 1 wherein said means for sealing the pod within the chamber further comprises a rotating cam in communication with a gear motor engaging said upper head linearly securing a pod between the upper head and the lower head when alignment is achieved between the upper head and lower head and hot water infusion in a pod is completed.

3. The single cup pod beverage brewer as recited in claim 1 further comprising a solid state controller recognizing manual coffee selection therefore regulating the volume of hot water entering through said upper head and exiting from an area on said lower head after the pod has been sealed.

4. The single cup pod beverage brewer as recited in claim 1 further comprising a solid state controller recognizing manual tea selection for regulating a discrete time interval for brewing along with the amount of hot water entering through said upper head and exiting from an area on said lower head after the pod has been sealed.

5. A single cup pod beverage brewer comprising, a) a pod containing coffee grounds or tea leaves surrounded by filter paper formed in a disc-like shape, b) a pod holding chamber, having a recess therein, configured to mate with said pod, said holding chamber having two separate halves comprising, an upper head and a lower head wherein said upper head having a hot water inlet and said lower head having a liquid outlet, c) an ejection disc slideably penetrating through said lower head, said disc having an integral spring loaded stem and a face plate sized to intimately embrace said pod when the pod is manually inserted between the lower head and upper head;

d) a upper head mounting frame attached to a horizontal base movably containing said upper head, e) a pair of lower head arcuate rotating arms for retaining said lower head, and a first shaft attached to said arms penetrating said upper head mounting frame, a first gear motor attached to said upper head mounting frame for rotating said shaft into three discrete positions i.e. a pod loading position, a pod brewing position and a pod disposal position, f) sealing means for sealing said pod within said pod holding chamber permitting hot water to be introduced into said chamber, said sealing means defined as a second gear motor, secured to said upper head mounting frame, and a cam driven by said second gear motor engaging said upper head to lower, seal and raise said upper head, g) a pod ejector, disposed on said upper head mounting frame horizontal base electromechanically propelling the pod from the chamber when the lower head is oriented vertically in the pod disposal position, thereby totally removing a pod from contact with the lower head for disposal.

h) an electronic control system having solid state direct current arrangement for functional regulation and alternating control for hot water system functions, and i) an enclosure, encasing said single cup pod beverage brewer protecting moving elements and electrical controls.

6. A single cup pod beverage brewer as recited in claim 5 further comprising, a hot water system having a tank, with level sensing probes, a hot water heater, a hot water pump and a inlet water level solenoid valve for attachment to a mains water source.

7. A single cup pod beverage brewer as recited in claim 5 further comprising, a pod waste bin having a bin full optical sensor adjacent thereunto, for sensing that the bin is full of spent coffee or tea pods indicating that the pods should be manually removed and discarded.

8. A single cup pod beverage brewer as recited in claim 5 wherein said pod holding chamber further comprising,
   an o-ring disposed on said upper head around said recess, configured to mate with said pod, for creating a water tight seal between said upper head and lower head when located in the brewing position,
   a strainer positioned within said recess for preventing stray coffee grounds or tea leaves from being included in the brew, and
   a plurality of dowel pins positioned in the upper head and said lower head having mating dowel pin holes for alignment of the upper head and the lower head when urged together by the sealing means.

9. A single cup pod beverage brewer as recited in claim 5 wherein said ejection disc face plate has a diameter of from 60% to 70% smaller than the chamber recess diameter.

10. A single cup pod beverage brewer as recited in claim 5 wherein said upper head mounting frame further comprises, a horizontal base, a pair of channel shaped columns attached to said base, and a lower head positioning solenoid attached to a single channel shaped column, for positioning said lower head in the pod brewing position.

11. A single cup pod beverage brewer as recited in claim 5 wherein said pair of lower head arcuate rotating arms further comprise, a coupling attaching said first gear motor located on said upper head mounting frame to said first shaft.

12. A single cup pod beverage brewer as recited in claim 5 wherein said sealing means further comprise, a pair of parallel brackets attached to said upper head mounting frame, said brackets having a pin disposed therebetween penetrating said cam such that when the cam is rotated by the second gear motor the cam engages the upper head on the cams periphery urging the upper head downwardly until mating with the lower head, when rotated in an opposite by the second gear motor, the pin penetrating the cam lifts the upper head away from the lower head.

13. A single cup pod beverage brewer as recited in claim 5 further comprising, said pod ejector having an ejection solenoid mounted on said upper head mounting frame horizontal base energized by said electronic control system for striking the ejection disc thereby totally removing the pod from contact with the lower head for disposal, said single cup pod beverage brewer further comprising a pod disposal bin removably housed within said enclosure to receive and store spent pods, said single cup pod beverage brewer further comprising an automatic pod loading, lower head door which opens by physical contact with the pod holding chamber upper head and closes by gravity.

14. A single cup pod beverage brewer as recited in claim 5 wherein said electronic control system further comprises, a solid state control board having light emitting diodes indicating functional operation of the system, for trouble shooting and a alternating current board for controlling hot water.

15. A single cup pod beverage brewer as recited in claim 5 further comprising, an instrument panel positioned on said enclosure having illuminated touch control switches for an open position, coffee brewing, tea brewing, hot water service and lights for water quality and bin full indication.

16. A single cup pod beverage brewer as recited in claim 5 wherein said enclosure further comprises, a body, a top panel, a back panel and a lower head door, wherein said enclosure is formed of a polyethylene thermoplastic formed by rotational molding.

17. A single cup pod beverage brewer as recited in claim 5 further comprising, said electronic control system recognizing manual hot water selection therefore regulating the volume of hot water entering through said upper head and exiting from said lower head.

\* \* \* \* \*